June 18, 1929.  L. W. HOSTETTLER  1,717,450
COOKING UTENSIL
Filed Feb. 9, 1927
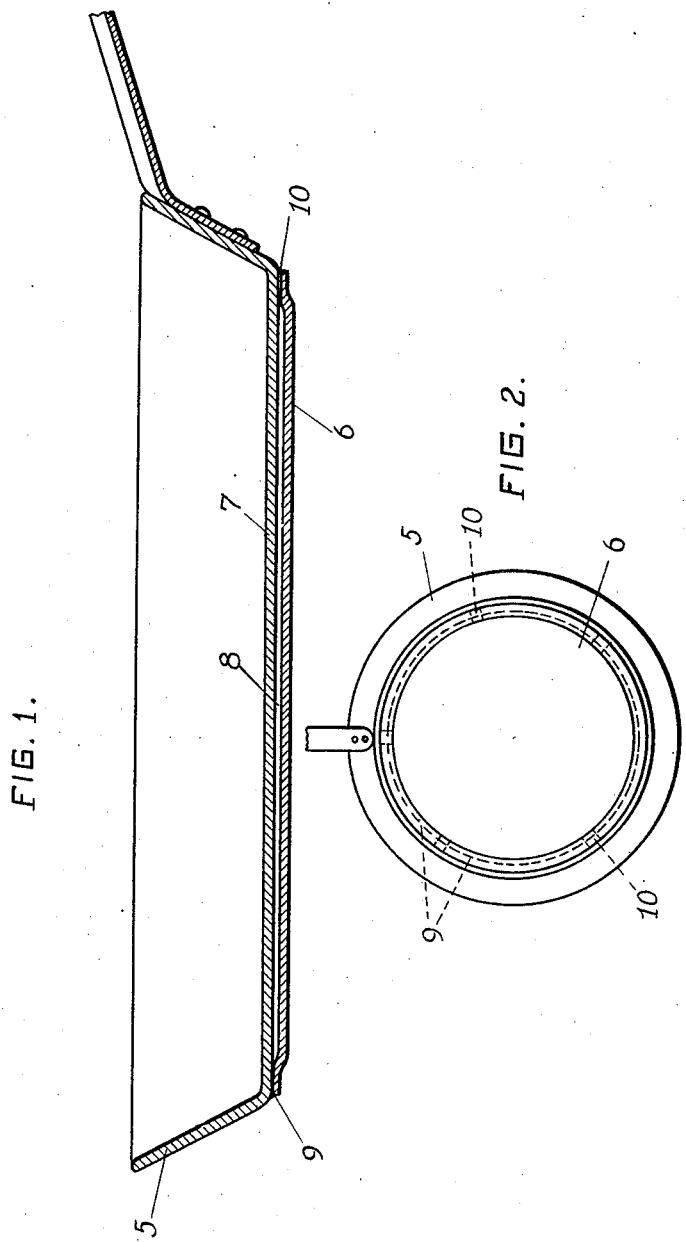
INVENTOR
Leigh W. Hostettler
By Green and McCallister
His Attorneys Patented June 18, 1929.

1,717,450

UNITED STATES PATENT OFFICE.

LEIGH W. HOSTETTLER, OF TARENTUM, PENNSYLVANIA, ASSIGNOR TO ALLEGHENY STEEL COMPANY, OF BRACKENRIDGE, PENNSYLVANIA, A CORPORATION OF PENNSYLVANIA.

COOKING UTENSIL.

Application filed February 9, 1927. Serial No. 166,924.

This invention relates to cooking utensils and more particularly to an improved construction for such devices when formed of sheet metal.

The structural characteristics of sheet metal are of such character that a cooking utensil such, for example, as a frying pan is objectionable when made from this material for the reason that it becomes very unevenly heated and the bottom quickly warps and burns through wherever the flame directly impinges thereon. The usual gas flame excessively heats those portions with which it comes most nearly, if not actually, in contact and the result is that the utensil, when made of sheet metal, is so unevenly heated as to present a serious difficulty to proper and uniform cooking. Also, those points subjected to the impingement of the flame quickly deteriorate in structure and burn through so as to render the utensil useless.

An object of this invention is to provide a cooking utensil of the type set forth of such construction and arrangement as to eliminate the objectionable features described.

A further object is to provide a sheet metal cooking utensil of such construction and arrangement as to insure an even heating of the bottom thereof, regardless of the type of flame in connection with which it is used.

A still further object is to provide a cooking utensil of improved form which will also be simple in construction and easy and cheap to manufacture.

These and other objects which will be apparent to those skilled in this particular art are accomplished by means of the invention illustrated in the accompanying drawings, wherein Figure 1 is a transverse sectional view through a frying pan constructed in accordance with one form of this invention and Fig. 2 is a plan view of the bottom thereof on a reduced scale.

The particular embodiment of this invention which has been chosen for the purposes of illustration is shown in connection with a frying pan 5 which is formed of sheet metal such, for example, as stainless steel and which is of the usual configuration. A false bottom 6 in the form of a guard plate is secured to the bottom 7 of the pan and is so shaped as to provide a substantially enclosed air space or chamber 8 therebetween.

The false bottom 6 or guard plate is mounted on the utensil in such a way as to permit egress of air from the ingress into the air chamber 8 so as to permit the free expansion of air therein under the effect of heat. In the illustrated embodiment of this invention this is accomplished by securing the plate 6 to the utensil by means of a raised annular peripheral flange and attaching this flange by spaced welds 9 which may be illustrated or in the form of any desired type of spot-welding. The unwelded or unsecured portions 10 between the weld sections form passages to permit the air to pass outwardly from the chamber 8 when the latter is subjected to heat and vice versa.

The guard plate or false bottom 6, together with the air chamber 8 provide a cooking utensil which can be cheaply manufactured from sheet metal without being subject to the above described and other disadvantages normally resulting from the use of a sheet metal structure in this class of devices. The heat will be evenly distributed throughout the bottom of the utensil and warping and burning through thereof will be effectively prevented.

It will, of course, be distinctly understood that although I have described what I now consider to be the preferred embodiment of this invention and shown it as applied to a particular form of cooking utensil, that various changes, additions, substitutions and omissions can be made therein without departing from the spirit of this invention or the scope of the appended claim.

It will be apparent that any form of device subject to heat can employ the invention with advantage.

What I claim as new and desire to secure by Letters Patent is:

A cooking utensil having a bottom and also an imperforate false bottom formed with a raised horizontal peripheral flange for spacing it a slight distance from the main bottom and affording an attaching surface therefor, the false bottom underlying the main bottom for substantially its entire area, the joint between the contacting portions of the main bottom and the upper face of said horizontal peripheral flange being spot-welded together at a plurality of spaced points and in a manner to provide a series of relatively narrow and shallow interstices between the sealed portions for permitting an air relief from the chamber between the two bottoms.

LEIGH W. HOSTETTLER.